United States Patent
Hirayama

(10) Patent No.: US 7,124,172 B1
(45) Date of Patent: Oct. 17, 2006

(54) METHOD FOR PROVIDING ANONYMOUS BROWSING BY TRANSFERRING A REQUEST FROM A SERVER TO A RELAYING APPARATUS IN RESPONSE TO THE REQUEST GENERATED AT A CLIENT COMPUTER

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 09/705,089

(22) Filed: Nov. 2, 2000

(30) Foreign Application Priority Data

Nov. 11, 1999 (JP) ............................... P11-321440

(51) Int. Cl.
*G06F 15/16* (2006.01)

(52) U.S. Cl. ...................... 709/217; 709/203; 709/225; 709/227; 709/246; 707/10; 715/507; 370/352

(58) Field of Classification Search ........ 709/202–203, 709/217, 219, 225, 227, 246; 707/10; 370/352; 715/507

See application file for complete search history.

(56) References Cited

U.S. PATENT DOCUMENTS

| | | | |
|---|---|---|---|
| 5,815,665 A * | 9/1998 | Teper et al. ................. | 709/229 |
| 5,907,677 A | 5/1999 | Glenn et al. | |
| 5,961,593 A * | 10/1999 | Gabber et al. ............... | 709/219 |
| 6,185,616 B1 * | 2/2001 | Namma et al. .............. | 709/227 |
| 6,192,123 B1 * | 2/2001 | Grunsted et al. ........... | 379/350 |
| 6,226,677 B1 * | 5/2001 | Slemmer ..................... | 709/227 |
| 6,345,288 B1 * | 2/2002 | Reed et al. .................. | 709/201 |
| 6,389,533 B1 * | 5/2002 | Davis et al. ................. | 713/162 |
| 6,397,246 B1 * | 5/2002 | Wolfe .......................... | 709/217 |
| 6,473,407 B1 * | 10/2002 | Ditmer et al. ............... | 370/252 |
| 6,480,881 B1 * | 11/2002 | Kubota et al. .............. | 709/202 |
| 6,560,640 B1 * | 5/2003 | Smethers ..................... | 709/219 |
| 6,600,733 B1 * | 7/2003 | Deng ........................... | 370/352 |

(Continued)

FOREIGN PATENT DOCUMENTS

| | | |
|---|---|---|
| EP | 0 899 918 | 3/1999 |
| WO | WO 98/10558 | 3/1998 |

OTHER PUBLICATIONS

"Anonymous Connections and Onion Routing" by Paul F. Syverson, David M. Goldschlag and Michael G. Reed; May 1997; pp. 44-54.*

(Continued)

*Primary Examiner*—Saleh Najjar
*Assistant Examiner*—Oanh Duong
(74) *Attorney, Agent, or Firm*—Oblon, Spivak, McClelland, Maier & Neustadt, P.C.

(57) ABSTRACT

A network system and communication method of same, a communication system, an information relaying apparatus and method of the same, and an information providing apparatus, which prevent personal information from being revealed when requesting more detailed material from a web page providing apparatus, wherein when a user system views a web page established by a web page carrying computer, if the user clicks a "CALL ME" button for inquiry, an information input screen controlled by a button management computer is displayed; when the user inputs his or her ID and inquiry content etc. from there, this information is transferred to an information relaying system and an identification number that does not enable identification of the user system is attached and transferred as the inquiry information with respect to an information providing system; and, when the information providing system replies to the user, this identification number is converted to the ID for identifying the user by the information relaying system for the response.

10 Claims, 6 Drawing Sheets

U.S. PATENT DOCUMENTS

| | | | |
|---|---|---|---|
| 2001/0011301 A1* | 8/2001 | Sato et al. | 709/219 |
| 2001/0034709 A1* | 10/2001 | Stoifo et al. | 705/51 |
| 2002/0097708 A1* | 7/2002 | Deng | 370/352 |
| 2003/0021259 A1* | 1/2003 | Miloslavsky et al. | 370/352 |

OTHER PUBLICATIONS

John Clyman, "Anonymous Browsing: Web rfing affords the illusion of anonymity but not necessarily the reality", PC Magazine, Oct. 1, 2003, vol. 22, Iss. 17, p. 83.*

Steven Brier, "Finding privacy on the Net; Protecting your e-mail and anonymous browsing rights is a Web site away", The New York Times, Rocky Mountain News, Jan. 1997, p. 6.f.*

Ephraim Schwartz, "Freedom Guarantees Anonymous Browsing", InfoWorld Electric, PC World Online, Feb. 1999, p. 1.*

Tom Mainelli, "Anonymous Browsing Gets Easier", PCWorld.com, Aug. 2001, p. 1.*

U.S. Appl. No. 09/696,936, filed Oct. 26, 2000, Pending.

U.S. Appl. No. 09/702,086, filed Oct. 30, 2000, Pending.

U.S. Appl. No. 09/730,343, filed Dec. 5, 2000, Pending.

U.S. Appl. No. 09/729,568, filed Dec. 4, 2000, Pending.

U.S. Appl. No. 09/705,089, filed Nov. 2, 2000, Pending.

U.S. Appl. No. 09/765,085, filed Jan. 18, 2001, Pending.

U.S. Appl. No. 09/810,188, filed Mar. 19, 2001, Pending.

U.S. Appl. No. 09/811,516, filed Mar. 20, 2001, Pending.

* cited by examiner

FIG. 5

| CUSTOMER No. | TELEPHONE No. | INFORMATION PROVIDER | INQUIRY CONTENTS | OP1 | OP2 | TIME |
|---|---|---|---|---|---|---|
| | | | | | | |
| | | | | | | |
| | | | | | | |
| | | | | | | |

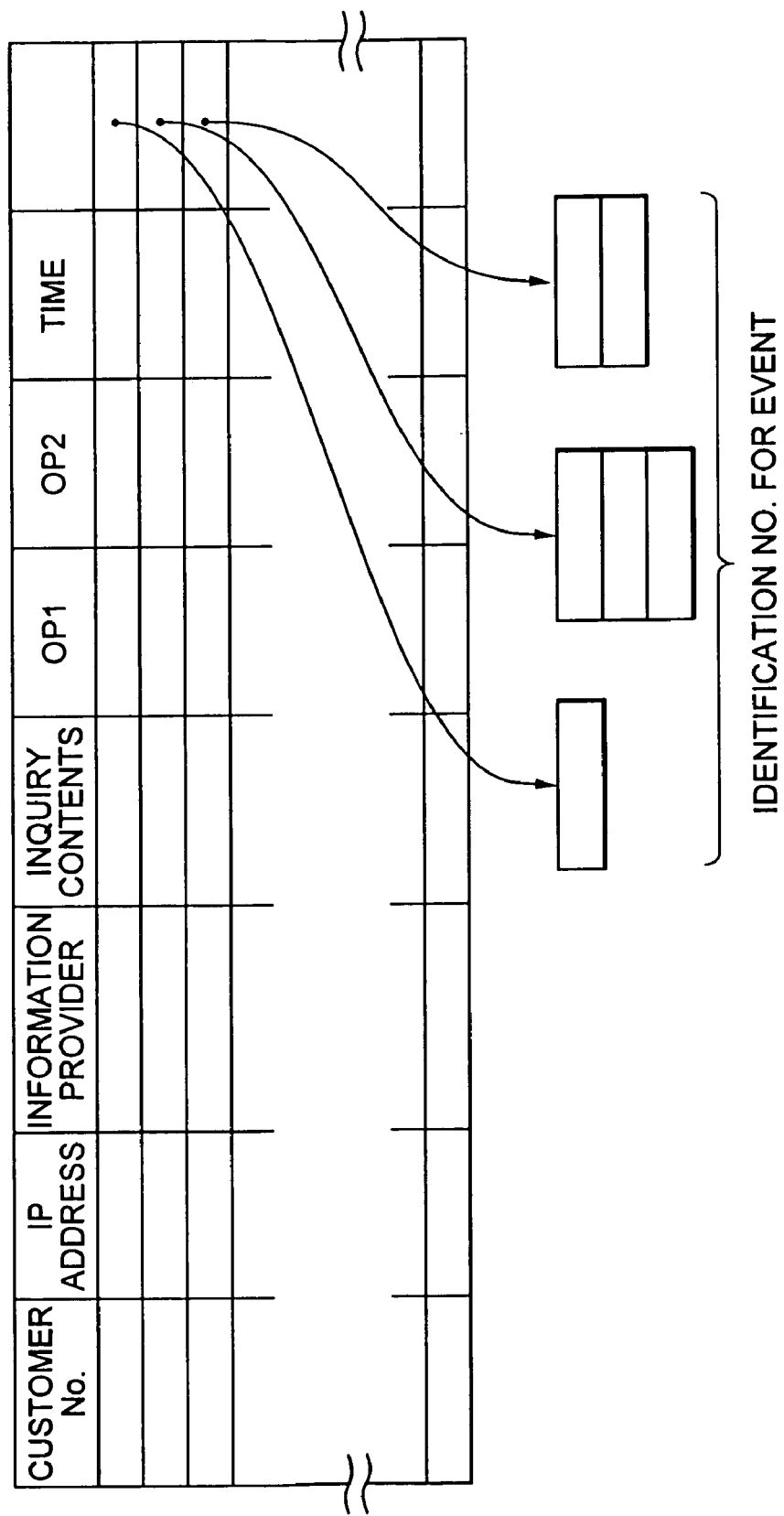

METHOD FOR PROVIDING ANONYMOUS BROWSING BY TRANSFERRING A REQUEST FROM A SERVER TO A RELAYING APPARATUS IN RESPONSE TO THE REQUEST GENERATED AT A CLIENT COMPUTER

BACKGROUND OF THE INVENTION

1. Field of the Invention

The present invention relates to a network system for establishing web pages on a network, for example the Internet, to introduce products to users, more particularly relates to a network system enabling a user to inquire about a product without giving his or her own personal information when inquiring about the product and a communication method, a communication system, an information relaying apparatus, and an information providing apparatus relating to the same.

2. Description of the Related Art

A general consumer (hereinafter referred to as a user) sometimes communicates with a company selling some sort of product so as to for example inquire about a product. Such an inquiry is usually by telephone.

Recently, however, reflecting the broad spread of the Internet, an increasing number of companies are setting up homepages. Descriptions of products, requests for materials concerning products, and other content can also be given or made by accessing the homepages in many cases.

The system disclosed in JP-A-H11-98136 is well-known, in which a registered user transmits a user ID and a request for products to relaying server so that the relaying server access the server of original information to send the products to the user.

Summarizing the disadvantage to be solved by the invention, such communication between the user and a company is a very good opportunity for the user to quickly obtain the required information and for the company directly contact the user to research market trends and promote its own image so is preferably more effectively utilized for both.

Heretofore, however, such communication has never been actively utilized due to the lack of convenience of the communicating means.

In an inquiry by for example the telephone, sometimes even if the user calls, he or she cannot easily connect. In such a case, the user feels unhappy and, in addition, must just wait while holding the telephone, so wastes time.

Further, even after the call is connected, the call is sometimes transferred or the person responding changed repeatedly until a person who can handle the inquiry is reached.

On the other hand, there are also disadvantages on the company side as well.

First, there is the disadvantage that it is impossible to predict the number of such inquiries and therefore it is difficult to deploy the number of operators capable of fielding all inquiries.

Further, it is difficult to suitably grasp the content of each inquiry and transfer a call to the proper person. Time and trouble are taken. Further, as a result, calls from users are sometimes passed around.

Further, there is also the disadvantage that deploying people able to suitable field various inquiries requires considerable training involving much time, so time and expense are involved.

Further, communication via a homepage tends to be avoided by a user since he or she easily becomes concerned that revealing his or her telephone number or address, mail address, and other personal information might lead to more than the necessary sales pitches of products or canvassing etc. continuing in the future.

SUMMARY OF THE INVENTION

An object of the present invention is to provide a network system and communication method capable of processing an inquiry, request for information, etc. from a user to a company without having the user wait or reveal his or her personal information and of facilitating handling also on the company side.

Another object of the present invention is to provide a communication system forming the basis for realizing a network system capable of processing an inquiry, request for information, etc. from a user to a company without having the user wait or reveal his or her personal information and of facilitating handling also on the company side.

Still another object of the present invention is to provide an information relaying apparatus and method of the same and an information providing apparatus suitable for application to the network system capable of processing an inquiry, request for information, etc. from a user to a company without having the user wait or reveal his or her personal information and of facilitating handling also on the company side.

According to a first aspect of the present invention, there is provided a network system having an information providing apparatus for providing any information via the network and a user apparatus capable of acquiring intended information via the network, comprising a user apparatus for requesting intended information with respect to a specific information providing apparatus to a predetermined information relaying apparatus different from said information providing apparatus, an information relaying apparatus for changing said request for information with respect to said user apparatus to a format that does not enable identification of the user apparatus originating the related request and transmitting the same to the information providing apparatus of the destination of the related request and, at the same time, when there is a request for communication from said information providing apparatus, performing predetermined communication with respect to said user apparatus and enabling communication between said information providing apparatus and said user apparatus, and an information providing apparatus providing any information via the network, requesting communication with said user apparatus originating the related request from said information relaying apparatus based on said request for information transmitted from said information relaying apparatus.

According to a second aspect of the present invention, there is provided a communication method between an information providing apparatus providing any information and any user apparatus connected by a network, wherein the user apparatus requests the intended information with respect to a specific information providing apparatus to a predetermined information relaying apparatus different from said information providing apparatus, said information relaying apparatus changes said request for information to a format that does not enable identification of the user apparatus originating the related request and transmits the same to the information providing apparatus of the destination of the related request, said information providing apparatus requests communication with said user apparatus originating the request based on said request transmitted from said information relaying apparatus with respect to said information relaying apparatus, and said information relaying apparatus performs predetermined communication with said user apparatus based on said request of communication and makes the communication between said information providing apparatus and said user possible.

According to a third aspect of the present invention, there is a communication system for performing intended communication between a second communication apparatus and a first communication apparatus based on a request of said first communication apparatus in a network with a plurality of communication apparatus connected therein, comprising a first communication apparatus for requesting intended communication with respect to a specific second communication apparatus to a predetermined relaying apparatus, a relaying apparatus for converting the request to a format that does not enable identification of the first communication apparatus originating the related request when said intended communication is requested from said first communication apparatus, requesting the related intended communication with respect to the second communication apparatus of the destination of the related request, and performing predetermined communication based on the related request with respect to said first communication apparatus when said second communication apparatus requests communication with said first communication apparatus, and a second communication apparatus for requesting communication with said first communication apparatus originating the request from said relaying apparatus when said relaying apparatus requests said intended communication and performing the intended communication based on said request with the related first communication apparatus.

According to a fourth aspect of the present invention, there is provided an information relaying apparatus comprising a first receiving means for receiving a request for intended information with respect to an information providing apparatus from the user, a converting means for converting said received request for information to a format that does not enable identification of the user apparatus originating the request, a transmitting means for transmitting said converted request for information to the information providing apparatus, a second receiving means for receiving a request of the communication with respect to said user apparatus from said information providing apparatus, a user apparatus detecting means for identifying the user apparatus of the destination of the communication based on said received request for communication, and a communicating means for predetermined communication based on said request with respect to the related user apparatus based on said detection result.

According to a fifth aspect of the present invention, there is provided an information relaying method comprising a step of receiving a request for intended information with respect to an information providing apparatus from a user apparatus, deleting information identifying the user apparatus originating the related request with respect to said request for information, imparting a predetermined identifier that does not enable identification of the user apparatus originating the related request but identifies the request for information, converting the same to a new request for information, and transmitting said converted request for information to the information providing apparatus, receiving the request for communication with respect to a user apparatus containing a predetermined identifier for identifying said request for information from said information providing apparatus, detecting information identifying the user apparatus of the destination of the communication based on said predetermined identifier of said received request of communication, and performing the predetermined communication based on said request with respect to the related user apparatus based on said detection result.

According to a sixth aspect of the present invention, there is provided an information providing apparatus comprising a first apparatus providing on a web page an object having a function of receiving input of any information enabling identification of a user apparatus accessing the web page and transferring the related received information to a specific apparatus in a format that does not enable viewing by the related information providing apparatus and providing any information on the network by using a web page that can perform the request via the related object with respect to the user apparatus requesting the communication and a second apparatus for performing predetermined processing for handling a request for communication comprised of said any request for communication received from said object converted to a format that does not enable identification of the user apparatus and transmitting the same to a predetermined designated response apparatus.

BRIEF DESCRIPTION OF THE DRAWINGS

These and other objects and features of the present invention will become clearer from the following description of the preferred embodiments given with reference to the accompanying drawings, in which:

FIG. 5 is a view for explaining inquiry information of users stored in a telephone number management computer of the information relaying system of the information communication system shown in FIG. 4; and FIG. 6 is a view explaining inquiry information of users stored in an information communication system according to a third embodiment of the present invention.

DESCRIPTION OF THE PREFERRED EMBODIMENTS

First Embodiment

A first embodiment of the present invention will be explained by referring to FIG. 1 to FIG. 3.

In the present embodiment, the present invention will be explained taking as an example an information communication system 100 which opens up a web page on the Internet to introduce products to a user and, at the same time, enables a user to directly inquire about or refer to products from the web page.

First, the overall configuration of the information communication system 100 will be simply explained.

Figure 1:
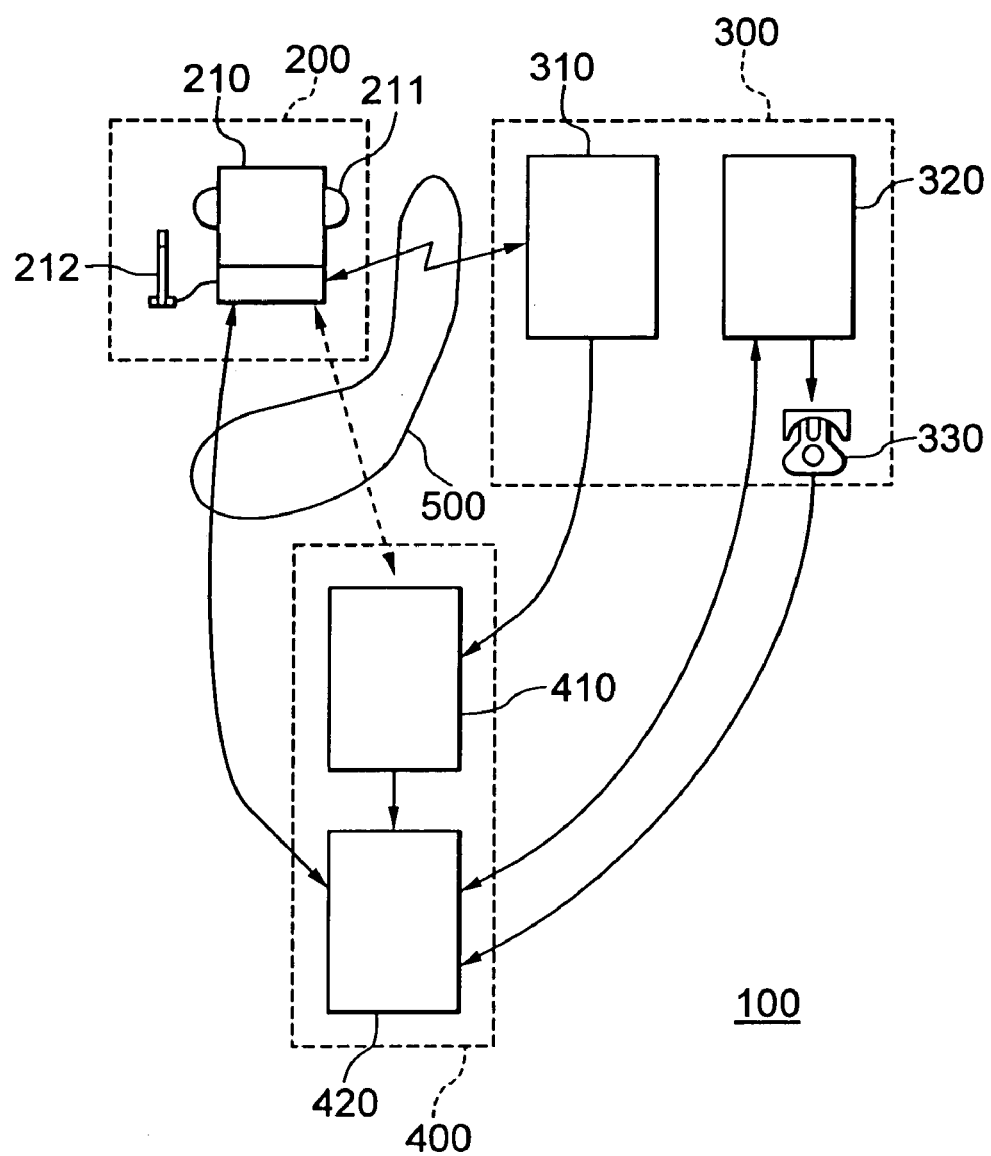
FIG. 1 is a block diagram of the configuration of an information communication system according to a first embodiment of the present invention.

FIG. 1 is a block diagram of the configuration of an information communication system 100 of the present embodiment.

The information communication system 100 has a user system 200, an information providing system 300, and an information relaying system 400.

The user system 200 is connected to the Internet 500 and is connected to also the information providing system 300 and the information relaying system 400 via the Internet 500.

Further, the information providing system 300 and the information relaying system 400 may be connected by any communication line. For example, the line may be an ordinary public line or dedicated line and also may be the Internet 500.

Next, an explanation will be made of the configuration of the parts of the information communication system 100.

The user system 200 comprises a personal computer 210 having a speaker 211 and a microphone 212.

The personal computer 210 has a browsing function for inspecting web pages on the Internet 500 and can view any web page on the Internet 500 by operation of the user.

Further, voice outputtable information in the information obtained via the Internet 500 is output from the speaker 211.

Further, the user system 200 has the function of a so-called Internet telephone for real time communication by voice via the Internet 500.

Accordingly, the user can converse with any other node through the Internet by using the speaker 211 and the microphone 212.

The information providing system 300 is a system provided in any group desiring to send some sort of information and has a web page carrying computer 310, a customer request management computer 320, and a telephone 330.

The web page carrying computer 310 is a server device for providing a web page carrying various information of that company via the Internet 500. The web page provided is viewed at the personal computer 210 of the user system 200 accessing the web page carrying computer 310 via the Internet 500.

When providing a web page, an object for receiving some sort of request from a user is sometimes provided. For example, this may include a request for more detailed material, information on a more detailed method for using the product etc., complaints about the products, and so on. In the web page carrying computer 310, when performing processing requiring contact with the user, in other words, processing where personal information of the user becomes necessary, a special object provided by the information relaying system 400 described later is used.

In this object, by user operation, the control is immediately transferred to an inquiry button management computer 410 of the information relaying system 400. Thereafter, the object is controlled from the inquiry button management computer 410. Accordingly, the information input via this object is not input to the web page carrying computer 310, but is directly input to the inquiry button management computer 410.

Figure 2A:
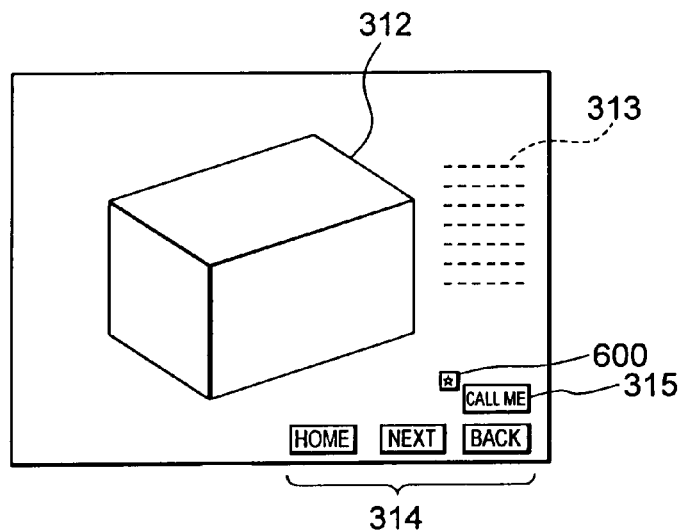
FIGS. 2A and 2B are views of an example of a web page provided by a web page carrying computer of an information providing system of the information communication system shown in FIG. 1.
Figure 2B:
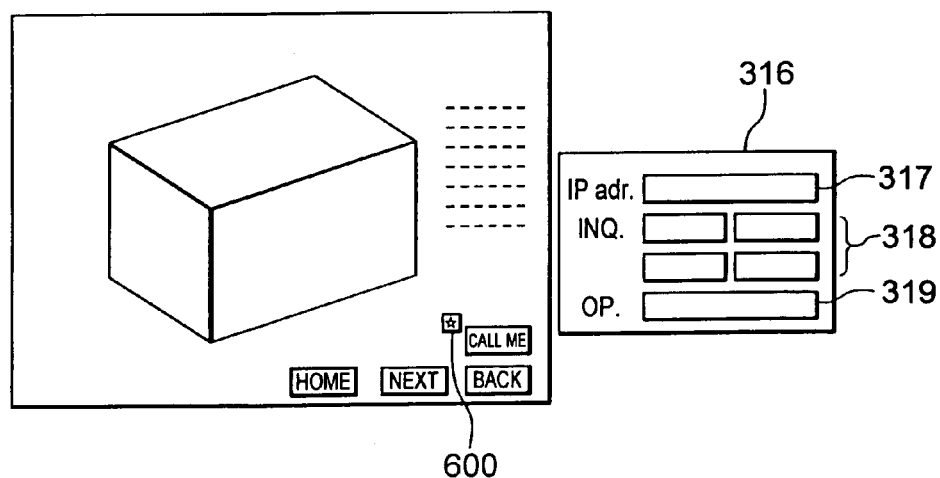

An example of a web page for introducing products provided by the web page carrying computer 310 is shown in FIG. 2A and FIG. 2B.

A page for each product includes, for example, as shown in FIG. 2A, an image 312 of the product, a simple explanation 313 of the product, buttons 314 such as "NEXT", "BACK", and "HOME" for moving to the previous or next page, and a "CALL ME" button 315 for inquiring about detailed information of the product. This "CALL ME" button 315 is a special object used when the user makes some sort of inquiry to the information providing apparatus mentioned above.

This object is given a mark 600 indicating that processing by this object is carried out without revealing anything the information providing system 300 in a fashion easily viewable by the user.

Then, when this "CALL ME" button 315 is depressed, under the control from the inquiry button management computer 410 of the information relaying system 400, as shown in FIG. 2B, an input screen 316 having a window 317 for inputting the IP address of the user, buttons 318 for selecting the type of the inquiry, and a window 319 for designating further detailed conditions etc. is displayed.

The type of the inquiry is for example a general request for information, an inquiry relating to maintenance and/or trouble, an inquiry about a product that has already been purchased, or a complaint and is indicated by selection of a button 318 prepared in advance.

Further, the detailed conditions include a condition such as whether the information is detailed information or somewhat simple information corresponding to the type of the inquiry, the detailed model name of the product, the type of the complaint, etc.

When the user inputs the data with respect to these items, this input screen is closed, the input data is transmitted to the inquiry button management computer 410, and a state where the web page is completely controlled from the web page carrying computer 310 is again exhibited.

The customer request management computer 320 is a database for storing various more detailed information regarding the products introduced on the web pages by the web page carrying computer 310 and information such as the persons in the information providing apparatus handling various inquiries from users in a variety of formats. Further, it receives inquiries from users input from the IP address management computer 420 of the information relaying system 400 mentioned later.

The customer request management computer 320 primarily extracts information for responding to a received inquiry from the stored data, requests connection with the user to the IP address management computer 420 when the response is prepared, and transmits the response when the communication with the user is secured.

Further, when an inquiry is made that cannot be handled automatically by the customer request management computer 320, processing is carried out for detecting the person suitable for handling that inquiry from the stored data and notifying the content of the inquiry to that person. As a result, when that person requests connection with the user via the telephone 330 or to the IP address management computer 420 and communication with the user is secured by a means of for example an Internet telephone, he or she converses with the user.

The customer number, product name, and information relating to the inquiry are input to the customer request management computer 320 from the IP address management computer 420. Accordingly, when the customer request management computer 320 automatically responds, the customer request management computer 320 extracts the information forming the response based on the product name and the information relating to the inquiry, notifies the customer number to the IP address management computer 420 to request connection with the user, and transmits the extracted information when the communication is secured.

In the present embodiment, it is assumed that detailed materials of the product and the data of voice explanations are stored for every product in the customer request management computer 320. Accordingly, when detailed information with respect to a product has been requested, it is assumed that the response is given according to the data forming the materials and the data of the voice explanation.

Further, when the person in charge in the information providing apparatus wishes to contact the user by the telephone 330, since the customer number is notified from the customer request management computer 320 to that person, that person calls the IP address management computer 420 from the telephone 330, inputs the customer number there by a tone signal or the like to ask the IP address management computer 420 to secure the communication path with the user.

The telephone 330 is a usual telephone and is used in the case where the person in charge contacts the user via the IP address management computer 426 and directly responds to an inquiry.

The information relaying system 400 has the inquiry button management computer 410 and an IP address management computer 420.

The inquiry button management computer 410 displays an object for input of inquiry information from the user to the information providing apparatus on the personal computer 210 of the user system 200 in accordance with the transfer of the control from the web page carrying computer 310, acquires the inquiry information, and outputs the same to the IP address management computer 420. At this time, the information on the company providing the web page or on the product being viewed in the web page etc. are simultaneously output to the IP address management computer 420.

Explaining this concretely, when the user operates the object provided on the web page provided by the web page carrying computer 310 and used when the user wants to access the selling company in some way, control with respect to the following web pages is immediately transferred from the web page carrying computer 310 to the inquiry button management computer 410.

Therefore, the inquiry button management computer 410 first displays an input screen 316 having a window 317 for inputting the IP address of the user, buttons 318 for selecting the type of the inquiry, and a window 319 for further designating further detailed conditions etc. as shown in FIG. 2B on the personal computer 210 of the user system 200 and prompts the input of the information.

Then, when the user inputs the data for these items, the inquiry button management computer 410 adds the information of for example the information providing apparatus and products obtained at the transfer of the control by the web page carrying computer 310 to the obtained information and outputs the same to the IP address management computer 420.

Then, it closes the input screen 316 and returns the control of the web page to the web page carrying computer 310.

Figure 3:
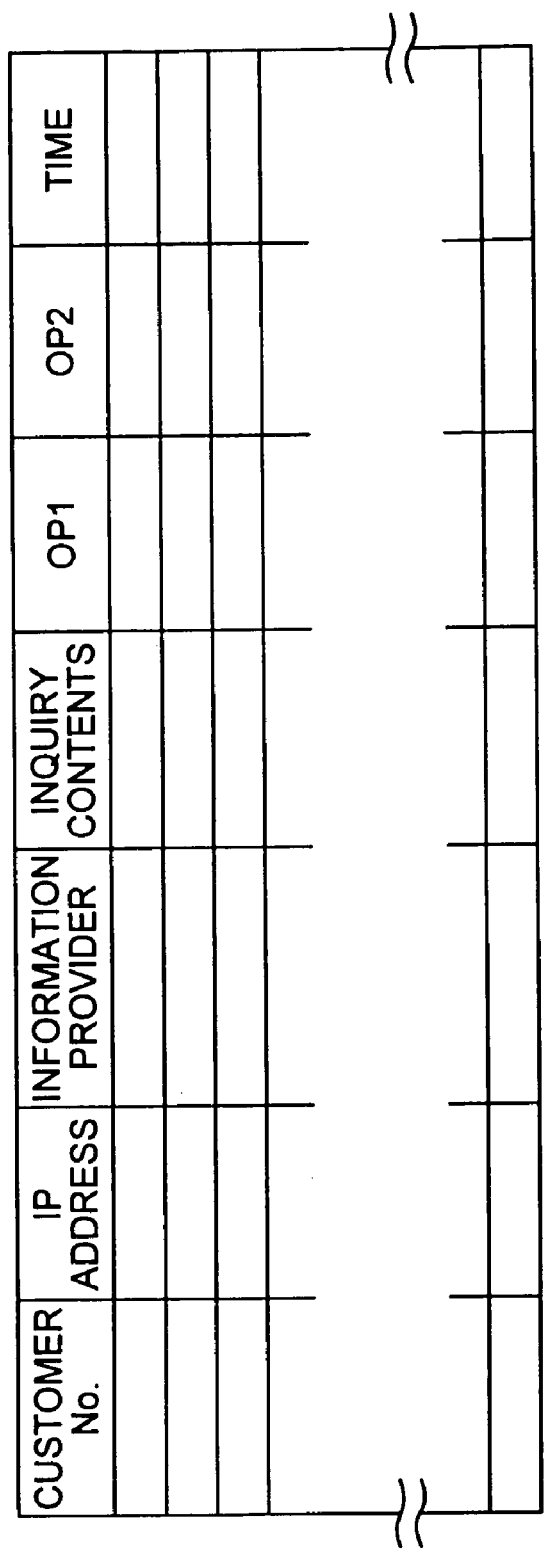
FIG. 3 is a view explaining inquiry information of users stored in an IP address management computer of an information relaying system of the information communication system shown in FIG. 1.

The IP address management computer 420 newly generates a customer number and adds it to each information in the information relating to the IP address of the user, information providing computer (information providing apparatus), and inquiry (inquiry contents, option 1 (OP1), and option 2 (OP2)) input from the inquiry button management computer 410 and adds the information of the time when the inquiry was made and stores the result in a tabular format as shown in for example FIG. 3.

At this time, the generated customer number may be given at random or generated from the IP addresses. Note that when it generated from the IP addresses, it is necessary to prevent the IP address from being detected from the generated customer number.

After storing the input information, the IP address management computer 420 outputs information relating to the customer number, products name, and inquiry to the customer request management computer 320 of the information providing system 300.

Further, when the customer number is input from the customer request management computer 320 and a communication path for responding to an inquiry is requested, the IP address management computer 420 refers to the stored data, detects the IP address of the user corresponding to that customer number, and accesses the personal computer 210 of the user. Then, the customer request management computer 320 and the personal computer 210 are de facto connected.

Due to this, the response to the inquiry is transmitted from the customer request management computer 320 to the personal computer 210.

Namely, when for example detailed information with respect to a product has been requested, the data constituting the detailed materials is displayed on the personal computer 210 or stored and the voice explanation is output from the speaker 211.

Further, when communication path is requested for responding to an inquiry by a call made from the telephone 330 of the information providing system 300 and the input of the customer number by a tone signal or the like, the IP address management computer 420 detects the IP address of the user corresponding to that customer number by referring to the stored data and accesses the personal computer 210 of the user. Then, it places the customer request management computer 320 and the personal computer 210 in a communicable state by the function of the Internet telephone.

By this, the person in charge of the information providing system 300 and the user can directly talk and the inquiry can be responded to.

Note that, in the present embodiment, the IP address management computer 420 will impart a different customer number to an inquiry from the same user if the occurrence is different.

Further, the data stored in the IP address management computer 420 is suitably erased.

Next, an explanation will be made of the operation of the information communication system 100 having such a configuration.

First, the user inspects for example the web page introducing the products provided by the web page carrying computer 310 of the information providing system 300 via the Internet 500 from the personal computer 210 of the user system 200.

As shown in FIG. 2A, the page for introducing the product is provided with the "CALL ME" button 315 for directly inquiring about detailed information of the product by telephone in addition to the image 312 of the product, a simple explanation 313 of the product, and the paging buttons 314.

The user finds a product he is interested in and clicks the "CALL ME" button 315 provided corresponding to the product when desiring further detailed information.

Due to this operation, control with respect to the web page is temporarily transferred from the web page carrying computer 310 to the inquiry button management computer 410, and the input of the information required for the inquiry is prompted by the inquiry button management computer 410 of the information relaying system 400. Namely, the web page for introducing the product displays the screen 316 for inputting the IP address and the inquiry contents as shown in FIG. 2B.

Then, the user inputs the telephone number of the telephone 220 of the user system 200 and the inquiry content by this screen 316.

When the telephone number and the inquiry content are input, the input content is transmitted to the inquiry button management computer 410. Further, the information of the product name and the information of the information providing apparatus detected when control is shifted from the web page carrying computer 310 are added and the result output to the IP address management computer 420.

The IP address management computer 420 allocates a customer number to the IP address of the user based on a predetermined rule, stores the information, and transmits the customer number, the input information of the type of the inquiry and the product name to the customer request management computer 320 of the information providing system 300.

The customer request management computer 320, based on the transmitted information, detects the stored information concerning the product as the information for response. Then, in order to respond to the user, it transmits the customer number to the IP address management computer 420 to demand connection with the user.

On one hand, the customer request management computer 320 detects the person in charge suitable for handling the inquired information and notifies the information of the inquiry to the person in charge. The person in charge receiving the notification examines the content and, if it is content for which he or she must directly contact the user, calls to the IP address management computer 420 from the telephone 330, transmits the notified customer number by tone signal, and requests conversation with the customer.

When the customer number is transmitted from the customer request management computer 320, the IP address management computer 420 detects the IP address of the user by referring to the table shown in FIG. 3, connects with the personal computer 210 via the Internet 500, and secures the communication path between the customer request management computer 320 and the personal computer 210.

Then, the customer request management computer 320 transmits the information of the response to the personal computer 210 via this secured communication path. Namely, the usual data is displayed on the personal computer 210 and voice data is output from the speaker 211.

Further, when the customer number is notified by a tone signal from the telephone 330, the IP address management computer 420 detects the IP address of the user by referring to the table shown in FIG. 3 and calls the personal computer 210 by the function of an Internet telephone via the Internet 500. Then, when the personal computer 210 responds that communication is possible, a communication path is secured so that the direct communication between the telephone 330 and the personal computer 210 is possible.

As a result, the person in charge in the information providing company and the user become able to directly talk.

In this way, in the information communication system of the present embodiment, the user can make any inquiry to the information providing apparatus without revealing personal information such as the IP address to the information providing apparatus. Then, he or she can acquire a response to the inquiry still in the state where no personal information such as IP address is revealed.

Further, the information provider can prevent a loss of opportunity for contact with the user, it becomes easier to facilitate acquisition of the voice, requests, and information from the user and for example obtain effective marketing information.

Second Embodiment

Next, an explanation will be made of a second embodiment of the present invention by referring to FIG. 4 and FIG. 5.

In the first embodiment, the user sent and received all information with the information providing system 300 and the information relaying system 400 via the Internet 500. In some cases, however, a quick response by ordinary phone is adequate. In the first embodiment, the Internet telephone could be used to handle such an inquiry, but the Internet telephone is not a widespread function.

Therefore, as a second embodiment, a system enabling a response from the information providing apparatus to be received by an ordinary subscriber telephones is illustrated.

First, an explanation will be given of the configuration of the information communication system 110 of the second embodiment by referring to FIG. 4.

Note that the same references are attached to components having similar functions to those of the first embodiment and explanations thereof will be omitted.

Figure 4:
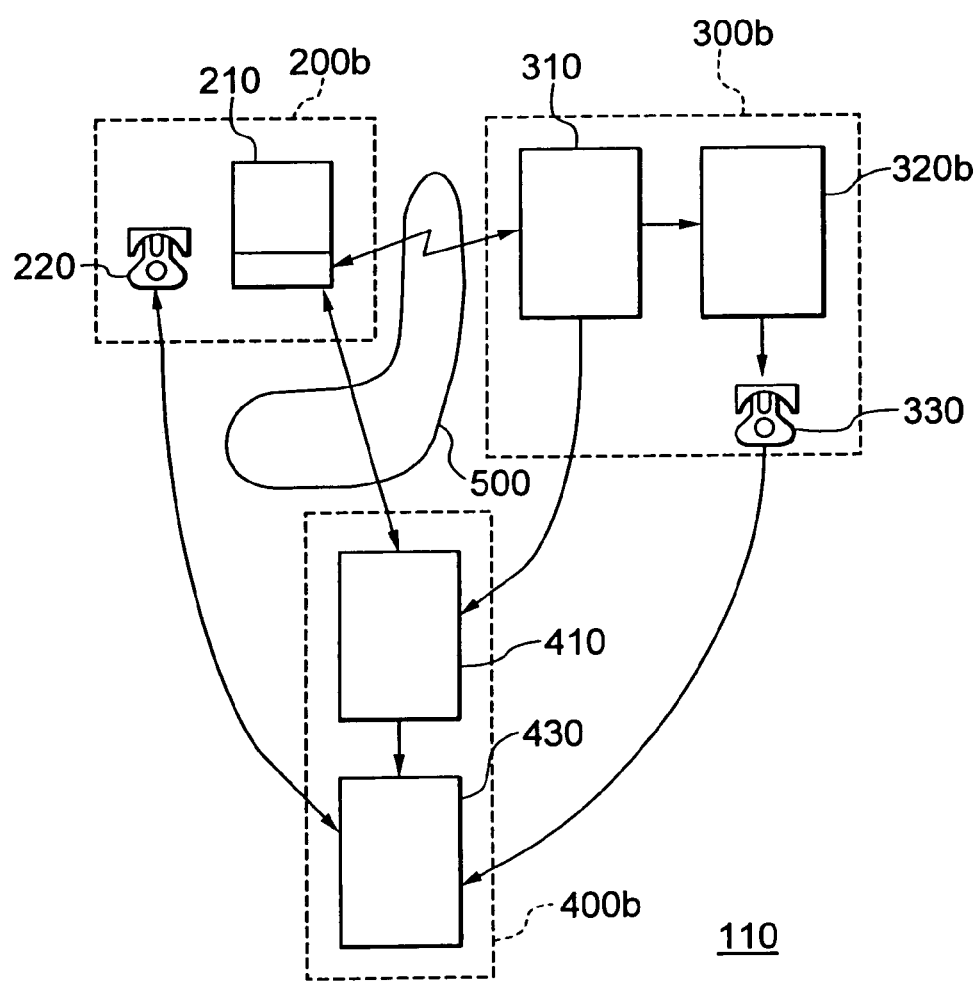
FIG. 4 is a block diagram of the configuration of an information communication system according to a second embodiment of the present invention.

FIG. 4 is a block diagram of the configuration of such an information communication system 110 of the second embodiment.

The information communication system 110 of the second embodiment has a user system 200b, an information providing system 300b, and an information relaying system 400b.

The user system 200 has the personal computer 210 and a telephone 220, the information providing system 300b has the web page carrying computer 310, a customer request management computer 320b, and the telephone 330, and the information relaying system 400b has the button management computer 410 and a telephone number management computer 430.

In such a configuration, the configurations of the personal computer 210, web page carrying computer 310, and button management computer 410 are basically the same as those of the first embodiment. Note, in the information communication system 110, the information for identifying the user input from the web page by the user when making an inquiry is not the IP address, but the telephone number, so the data item to be processed changes.

The telephone 220 of the user system 200b is a usual telephone connected to the public line and used when the person in charge in the information providing apparatus directly orally responds to an inquiry made by the user. This telephone 220 is called from the person in charge in the information providing apparatus by mediation of the telephone number management computer 430 of the information relaying system 400 mentioned later.

The customer request management computer 320b of the information providing system 300b is configured so as not to perform the processing for searching through the database to extract information forming the response to the inquiry of the user and transmitting the same to the user via the Internet, but to perform only the processing for detecting the person in charge suitable for responding to the inquiry of the user and notifying the inquired content to the person in charge.

The telephone number management computer 430 of the information relaying system 400b newly generates a customer number and adds this to the information in the information of the telephone number of the user and information according to the information providing apparatus and the inquiry (inquiry contents, option 1 (OP1), and option 2 (OP2)) input from the inquiry button management computer 410 or adds the information of the time when the inquiry was made and stores the same in a tabular format as shown in for example FIG. 5.

When the input information is stored, the telephone number management computer 430 outputs the information according to the customer number, product name, and the inquiry to the customer request management computer 320 of the information providing system 300.

Then, when there is a call from the telephone 330 of the information providing system 300 and the customer number is input by a tone signal or the like, it refers to the stored data, detects the telephone number of the user corresponding to the customer number, and calls that number. Then, it places the telephone 220 and the telephone 330 in a communicable state.

Due to this, the person in charge in the information providing system 300 and the user can directly talk and thus inquiry responded to.

Note that the telephone number management computer 430 will impart a different customer number to an inquiry from the same user if the occurrence is different.

Further, the data stored in the telephone number management computer 430 is suitably erased.

Next, an explanation will be given of the operation of the information communication system 110 having such a configuration.

The processing by which the user views the web page, finds a product he or she is interested in, and clicks the "CALL ME" button 315 to get further detailed information is the same as that of the first embodiment.

When clicking the "CALL ME" button, the web page for introducing the product displays a screen for input of the telephone number and the inquiry content, so the telephone number of the telephone 220 and the inquiry content are input from this screen.

The input information is transferred together with the information of the information provider and the product to the telephone number management computer 430, and a customer number corresponding to the telephone number of the user is allocated and stored in the tabular format as shown in FIG. 5.

Then, the telephone number management computer 430 transmits the generated customer number and the information of the input inquired content to the customer request management computer 320b of the information providing system 300b.

The customer request management computer 320b selects the person in charge who can handle the inquiry of the product based on the transmitted information and instructs the person in charge to call the telephone number management computer 430 from the telephone 330.

The telephone number management computer 430 prompts the input of the customer number when there is a call from the telephone 330. By this, the person in charge inputs the customer number by using a means such as the tone buttons.

The telephone number management computer 430 finds the telephone number of the customer by referring to the stored table based on this and automatically calls the telephone 220 of the user system 200b.

As a result, the person in charge in the information providing system 300b can directly talk to the user and respond to the inquiry.

As explained above, in the information communication system 110 of the second embodiment, similar to the first embodiment, the user can make an inquiry with respect to the information provider without directly revealing personal information such as the telephone number to the information provider. Further, he or she can obtain a response to the inquiry in the state where no personal information such as the telephone number is revealed.

Further, particularly he or she can directly talk by the phone via a usual telephone, therefore the range of application becomes broader.

Further, the information providing company can determine the inquiry content to a certain extent before directly communicating, for example, by speech with the user by the phone, so advance preparation can be efficiently made.

Third Embodiment

Next, an explanation will be made of a third embodiment of the present invention by referring to FIG. 6.

In the first and second embodiments, the data stored in the IP address management computer 420 or the telephone number management computer 430 were suitably erased. Further, different customer numbers were individually attached even with respect to inquiries from the same user.

However, if statistical processing is suitably carried out for such inquiry data from the customer in a state where confidentiality is maintained, data effective in various points for the information provider may be obtained.

Such an information communication system actively utilizing the state of inquiry from the user will be explained as a third embodiment of the present invention.

The information communication system of the third embodiment differs only in the method of information processing in the IP address management computer 420 or the telephone number management computer 430 and can be applied to both of the first and second systems. Below, an explanation will be made taking as an example the user management computer 420.

First, basically, the IP address management computer 420 does not erase the inquiry information, but sequentially stores it.

By just this, information of for example the frequency of occurrence of inquiries can be obtained for every time band. Further, it also becomes possible to analyze the types of the inquiries, for example what inquiries are frequently made in which time band.

If such information can be provided to the information provider, the information provider can optimize the deployment of the operators etc.

More preferably, the IP address management computer 420 stores the inquiries from the same user linked together.

For this purpose, the customer number is made a number that is uniquely determined for every customer. Another identification number for reporting to the information provider is generated and allocated for every generated inquiry (event).

In this case, for example as shown in FIG. 6, the newest inquiry information is stored with respect to the customer number. Identification numbers used for inquiries successively generated from that customer are stored in the indirectly designated storage region. When doing this, at least the number of times of the inquiries made by that customer can be easily grasped.

Further, by doing this, since a different identification number is notified to the information providing company every time even for inquiries from the same customer, the action of identifying the personal information of the user by linking them etc. can be prevented.

Note that, even if the inquiry information from the user is stored in this way, preferably it is sequentially erased and updated every certain period.

In this way, according to the information communication system of the third embodiment, it is possible to obtain a log of inquiries and responses for both of the user and the web page carrying organization. Accordingly, by performing for example statistical processing on this, it is also possible to perform processing for example for extracting problematic users and web page carrying organizations or extracting web page carrying organizations accessed many times.

Further, the interface between the user and the information provider can be made more proper and efficient.

Modification

Note that, the present invention is not limited to the present embodiments. Various modifications are possible.

For example, the first embodiment was comprised so that the user designated the IP address at the time of an inquiry and so that the information provider responded to the inquiry via the Internet. Further, the second embodiment was comprised so that the user designated the telephone number at the time of the inquiry and the information provider responded to the user via an ordinary phone. However, neither of these communication media has to be selected. The user may designate both of the IP address and the telephone number and obtain a response by any method and any means. Further, it is also possible to obtain a response by any method by using any medium other than this.

Further, as the method of transferring the information input on the web page viewed on the personal computer 210 and provided from the web page carrying computer 310 of the information providing system 300 to the information relaying system 400 in the state concealed from the information providing system 300, in the embodiments, the method was employed of using an object immediately shifting control to the inquiry button management company 410 together with the execution and inputting the information based on the environment provided from the inquiry button management computer 410 at the time of input of the information. However, this method may be any method. For example, it is also possible to input information desired to be concealed and transfer the input information to the inquiry button management computer 410 in a secure state by providing the information relaying system 400 with an object and a management module for managing information in a state encrypted to the information providing system 300 and have the information providing system 300 arrange this on the web page.

Further, in the above embodiments, the web page carrying computer 310 for providing the web page was provided as a device on the company side providing the information. However, this web page carrying computer 310 may be the system of a third party different from the information providing apparatus too. For example, this is when the information provider asks an external provider or the like to set up the web page. It is clear that such a case is within the scope of the present invention without problem using exactly the same processing as that of the case of the present embodiments.

Further, as a format resembling this, a case where a third party having the web page carrying computer 310 is the organization guaranteeing secure processing similar to a business having the information relaying system can be considered. In such a case, the web page carrying computer 310 can perform the processing without using an object or encryption module provided from the information relaying system 400. Namely, it is possible for an organization to receive an inquiry from a user in the same way as a usual interface and to respond to the request at its responsibility not by transferring information to the information provider, but by transferring it to the information relaying system 400. Such a format is also within the scope of the present invention.

Further, the information relaying system 400 of the information communication system of the present invention does not have to have a special construction, but such a function can be provided by for example a telephone office.

Summarizing the effects of the invention, as explained above, according to the present invention, it is possible to provide a network system and a communication method whereby inquiries, requests for information, etc. from the users to the company can be processed without having the user wait or revealing his or her personal information and facilitating handling at the company side.

Further, a communication system forming the basis for realizing such a network system can be provided.

Further, an information relaying apparatus and a method of the same and an information providing apparatus preferable for such a network system can be provided.

While the invention has been described with reference to specific embodiment chosen for purpose of illustration, it should be apparent that numerous modifications could be made thereto by those skilled in the art without departing from the basic concept and scope of the invention.

What is claimed is:

1. A method of communication between an information providing apparatus and a user apparatus, comprising steps of:

Initially generating a request for information at an information providing apparatus from the user apparatus, the initial request not identifying the user apparatus;

transferring the initial request not identifying the user apparatus from the information providing apparatus to an information relaying apparatus in response to said initially generating step;

sending information related to the initial request and a user identifier identifying the user apparatus from the user apparatus to the information relaying apparatus after the transferring step;

generating a customer number based on the user identifier at the information relaying apparatus;

sending the information related to the initial request and the customer number to the information providing apparatus from the information relaying apparatus;

the information providing apparatus requesting the information relaying apparatus to establish a communication path between the information providing apparatus and the user apparatus after the information providing apparatus receives the information related to the initial request and the customer number sent by the information relaying apparatus; and establishing the requested communication path between the information providing apparatus and the user apparatus, wherein said user apparatus accesses a web page provided by the information providing apparatus through a network and uses a first object for said initially generating the request for said information provided in the web page so as to initially request said information from the information providing apparatus, and said information relaying apparatus displays a second object for inputting said information relating to the initial request in a first state that is not viewed by said information providing apparatus and transfers the information related to the initial request to said information relaying apparatus in a second state that is not viewed by said information providing apparatus.

2. The method of communication as set forth in claim 1, wherein said user identifier includes one or both of an IP address and telephone number of the user apparatus.

3. The method of communication as set forth in claim 1, wherein said information providing apparatus searches for a person suitable for responding to said information related to the initial request based on said information related to the initial request and notifies said information related to the initial request to the person.

4. The method of communication as set forth in claim 1, wherein said information providing apparatus requests, by telephone, communication by voice as said requested communication path; and said information relaying apparatus secures a voice communication path between said information providing apparatus and said user apparatus as said requested communication path.

5. The method of communication as set forth in claim 1, wherein said information providing apparatus requests, by telephone to the information relaying apparatus, communication by voice as said requested communication path; and said information relaying apparatus requests a real time voice communication path between said information providing apparatus and said user apparatus as said requested communication path.

6. The method of communication as set forth in claim 1, further comprising:

storing identification information comprising the request, the user identifier, and the customer number at the information relaying apparatus.

7. The method of communication as set forth in claim 1, further comprising detecting the identification information and identifying the user apparatus based on said identification information and said customer number received from said information providing apparatus.

8. The method of communication as set forth in claim 1, further comprising:

storing and analyzing a plurality of requests from the user apparatus.

9. The method of communication as set forth in claim 8, wherein said storing the plurality of requests includes storing time information relating to a time of occurrence of each of the plurality of requests, and said analyzing analyzes said time information using the time as an indicator.

10. The method of communication as set forth in claim 1, wherein the communication path includes a network, a telephone line, a network telephone function through a network, or any combination thereof.

* * * * *